April 29, 1952 — S. E. RICHESON ET AL — 2,594,584
PRESSURE COOKING UTENSIL
Filed Feb. 25, 1947

INVENTORS
SANFORD E. RICHESON
JOSEPH A. ALLEGRO
By John P. Wisonow
ATTORNEY

Patented Apr. 29, 1952

2,594,584

UNITED STATES PATENT OFFICE 2,594,584

PRESSURE COOKING UTENSIL

Sanford E. Richeson and Joseph A. Allegro, New York, N. Y., assignors of one-third to Louis C. Huber, Ridgewood, N. J.

Application February 25, 1947, Serial No. 730,791

5 Claims. (Cl. 220—44)

Our invention relates to pressure cooking utensils and has particular reference to vessels for cooking food under pressure.

A cooking utensil or cooker of a conventional type is usually provided with a cover which is locked in an operating position by turning the cover into a position in which its lugs or projections engage corresponding lugs or projections on the vessel thereby locking the cover on the vessel. Such cookers have a disadvantage in that they must be cooled off, as by placing them in cold water, before the cover is opened. Numerous accidents have happened to the users of such cookers when the cover of the cooker was opened before the vapor pressure was reduced to zero.

Our invention has for its object to provide a cooking utensil so constructed that the cover cannot be opened until the pressure is released or reduced to zero. We provided for this purpose a hinged handle on the cover operatively connected with a valve in the cover in such a manner that the valve is automatically opened by the rotational movement of the handle before the handle becomes operative for rotating the cover, so that the pressure is automatically released before the cover is opened.

Another object of our invention is to provide means to lock the rotary handle in its valve-releasing position so that the cooker can be closed and placed on the fire with the valve open, closing the valve when the boiling temperature is reached, from which point the accurate timing of the cooking can be started.

Another object of our invention is to construct the cover and vessel handles in such a manner that one handle can be fitted into the other from the side when the cover is closed, both handles forming a convenient single handle.

Figure 1:
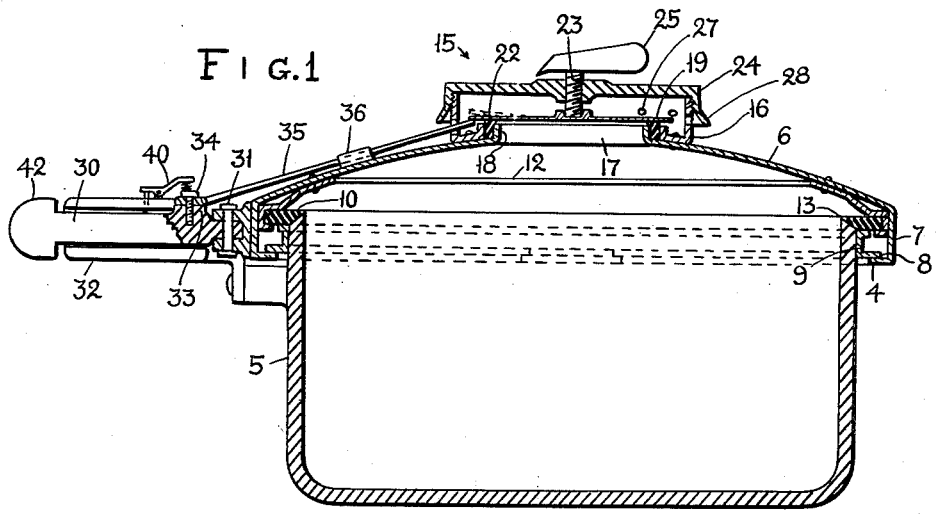
Figure 2:
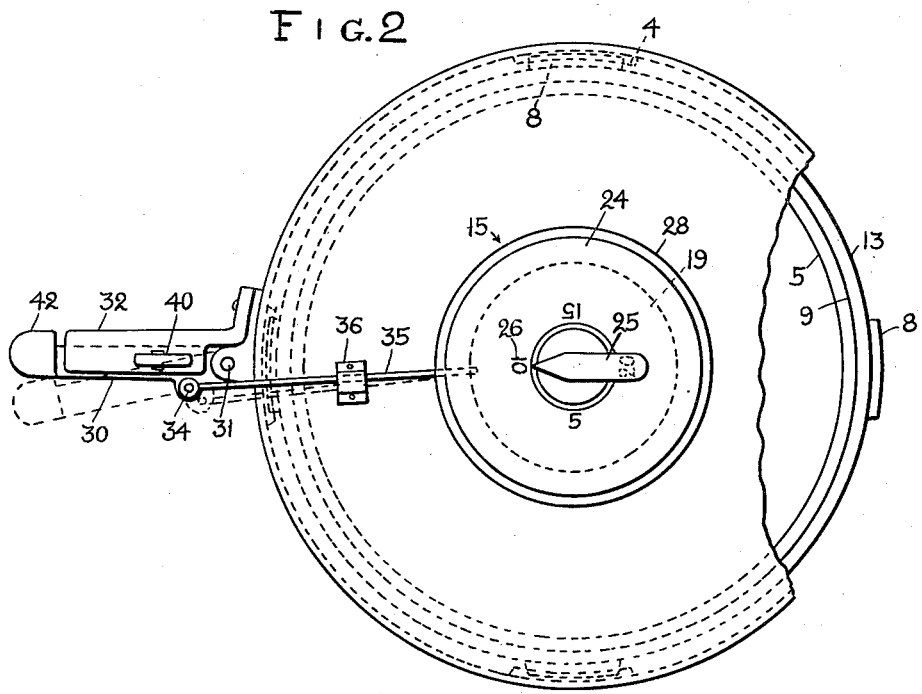

The foregoing objects, features and advantages of our invention are more fully described in the accompanying specification and drawing in which:

Fig. 1 is a sectional elevational view of our cooking utensil showing the cover in a closed and locked operative position; and Fig. 2 is a top plan view of the same partly in section.

Our pressure cooking utensil comprises a vessel 5 of a generally cylindrical shape open at the top and provided with a cover 6. The vessel and the cover are made of a suitable metal such as aluminum or steel, preferably by stamping or drawing of a sheet material. The cover has a depending flange 7 encircling the upper portion of the vessel and provided with inward extending shelves 4 engaging lugs 8 extending from the lower flange of a channel-shaped ring 9 secured to the outer side of the vessel near its top. The upper side of the ring forms a support for a sealing ring or gasket 10 made of rubber or similar elastic material. The peripheral portion of the sealing ring is fitted in an annular groove in a ring 12 secured to the under side of the cover. The inner tapering edge 13 of the sealing ring 10 rests on a correspondingly tapering upper edge of the vessel in such a manner that the edge of the ring is pressed against the edge of the vessel by the vapor pressure in the vessel.

The cover is provided with a safety valve generally indicated at 15. It comprises a casing 16 open at the top and secured to the cover over an opening 17 defined by a raised flange 18 of the cover. The opening 17 is closed by a valve disc or plate 19 made of a resilient flexible steel metal. A sealing ring 22 is placed on the cover under the plate 19. The plate is pressed against the sealing ring by a screw 23 engaging the central portion of the plate and threaded into a cap 24 threaded on the upper portion of the casing 16. A handle 25 on the screw 23 is used for adjusting the pressure on the valve plate 19 by placing the point of the handle opposite a mark 26 on the cap 24. Usually four marks are provided, for pressures from 5 to 20 lbs. per square inch. Holes 27 are provided in the casing 16 for the escape of vapors released from the valve. A flared-out skirt 28 on the cap 24 extends below the holes 27 to deflect the escaping vapors downward.

The cover is provided with a handle 30 pivoted at 31 for rotation in a horizontal plane. The main portion of the handle is of relatively small diameter and is made to fit in a corresponding recess at the side of a handle 32 extending from the vessel 5. Thus, the two handles form a single handle when the cover is turned into its closed and locked position on the vessel as shown in Figs. 1 and 2.

The cover handle 30 has a lug 33 at the side to which is pivotally connected at 34 one end of a rod 35, the other end of the rod passing through a corresponding hole in the wall of the valve casing 16 and engaging the under side of the valve plate 19. A clip 36 on the cover guides the rod in its movements. The rod is so arranged that it moves into the valve casing and raises the edge of the valve plate 19 thereby releasing the vapors in the vessel when the handle 30 is turned to one side as shown in dotted lines in Fig. 2. The resiliency of the valve plate 19 tends to move the rod back and to turn the handle 30 into its normal radial position. A spring latch 40 is provided on the vessel handle 32 and prevents the cover handle from entering the recess at the side of the vessel handle 32 when the cover is turned into its closed position. Thus, the valve remains open and no pressure can be built up in the vessel until the latch 40 is depressed allowing the handle 30 to be moved into the hollow of the handle 32. The handle 30 is longer than the handle 32 so that its end extends beyond the end of the handle 32. Such an arrangement makes it impossible to jerk the cover open by suddenly moving the handle 30 because this handle cannot be grasped in a hand while it is positioned in the handle 32. To open the cover, it is necessary to rotate the handle 30 by applying thumb or finger pressure to the end 42 of the handle 30 until the handle is turned on its pivot thereby opening the valve and releasing the vapor pressure in the vessel 5. The handle 30 cannot be grasped in a hand for turning the cover until the lugs 8 on the vessel are disengaged by the shelves 4 of the cover. The cover can then be safely removed, there being no pressure in the vessel.

Should there be any slight pressure left in the vessel, the escaping vapors cannot cause any injury to the operator because the handle 32 is raised above the lower edge of the cover and hence above the path of the escaping vapors. Moreover, the depending flange on the cover causes the vapors to be directed downward. As an additional protection, the escape holes 27 in the valve casing are located at the side opposite the handle 30.

With our mechanism for automatic control of the valve, it is possible to time the cooking more accurately than with conventional cookers, because the valve can be left open until the vapor formation starts, and then the valve can be closed simply by depressing the latch 40, whereupon the count of the cooking time can be started.

It will be understood that various features and principles of each of the embodiments of the invention above described or referred to may be utilized or substituted in the other embodiments.

While the invention has been described in detail with respect to certain particular preferred examples, it will be understod by those skilled in the art after understanding the invention, that various changes and further modifications may be made without departing from the spirit and scope of the invention and it is intended therefore in the appended claims to cover all such changes and modifications.

The following is claimed as new:

1. A pressure cooking utensil comprising a vessel of a circular shape open at the top; a circular cover for the vessel; cooperative locking elements on the vessel and on the cover for locking the cover on the vessel in its operative position by the rotation of the cover relative to the vessel; a handle secured to the vessel; a handle on the cover; a vertical pivot pivotally connecting the cover handle to the cover; a valve in the cover; the cover having an opening for the valve, the valve comprising a flexible plate seated with its rim upon the edge of the cover opening, pressure means applied to the central portion of the plate for pressing the plate against its seat on the edges of the opening, the rim of the plate being capable of being bent upwardly by the vapor pressure in the vessel when said pressure reaches a predetermined value; an elongated member mounted axially slidably on the cover and operatively connected at one end to the cover handle, the other end of the elongated member engaging the rim of the plate on the side thereof facing the cover for bending upwardly the rim of the plate thereby releasing the vapor pressure in the vessel when the cover handle is pivoted away from the vessel handle.

2. A pressure cooking utensil comprising a vessel open on the top, a cover for the vessel, cooperative locking elements on the vessel and on the cover for locking the cover on the vessel in its operative position by rotating the cover relative to the vessel in one direction and for unlocking the cover by rotating the same in opposite direction, a handle laterally extending from the vessel, a handle laterally extending from the cover, said handles being positioned and arranged to be substantially in registry when the cover is locked to the vessel, pivot means pivotally connecting the cover handle to the cover for pivoting the said handle in the plane of the cover rotation, yieldable valve means supported on the cover and controlling communication between the outer air and the interior of the vessel, said valve means including screw means urging the valve means into a closed position, and a control member operatively connected to the cover handle for movement in unison therewith and engaging the valve means for moving the same into the open position against the action of the screw means or releasing the valve means for closing by the action of the screw means, said control member lifting the valve means into the open position and maintaining the same in the said position upon pivoting of the cover handle in the direction of the cover rotation for unlocking the cover and releasing the valve means for locking by the screw means upon pivoting of the cover handle in opposite direction and toward its position of registry with the vessel handle.

3. A pressure cooking utensil comprising a vessel open on the top, a cover for the vessel, cooperative locking elements on the vessel and on the cover for locking the cover on the vessel in its operative position by rotating the cover relative to the vessel in one direction and for unlocking the cover by rotating the same in opposite direction, a handle laterally extending from the vessel a handle laterally extending from the cover, said handles being positioned and arranged to be substantially in registry when the cover is locked to the vessel, pivot means pivotally connecting the cover handle to the cover for pivoting the said handle in the plane of the cover rotation, said vessel handle being recessed at one of its sides and arranged to receive the cover handle in said recess when the cover is in a position locked to the vessel, yieldable valve means supported on the cover and controlling communication between the outer air and the interior of the vessel, said valve means including screw means urging the valve means into a closed position, and a control member operatively connected to the cover handle for movement in unison with the same and engaging the valve means for moving the same into the open position against the action of said screw means or releasing the valve means for closing by the action of the screw means, said control member lifting the valve means into the open position and maintaining the same in the said position upon pivoting of the cover handle in the direction of the cover rotation for unlocking the cover and releasing the valve means for locking by the screw means upon pivoting of the cover handle in opposite direction and toward its position of registry with the vessel handle.

4. A pressure cooking utensil as described in claim 3, in combination with latch means on the vessel handle arranged to normally block reception of the cover handle in said recess of the vessel handle and movable into a position uncovering said recess for reception of the cover handle in said recess and in the position for releasing the valve means.

5. A pressure cooking utensil as described in claim 3, wherein the end of the cover handle is extended in radial direction beyond the end of the vessel handle and arranged to be grasped by an operator's hand for pivoting the cover handle and rotating the cover.

SANFORD E. RICHESON.
JOSEPH A. ALLEGRO.

REFERENCES CITED

The following references are of record in the file of this patent:

UNITED STATES PATENTS

| Number | Name | Date |
| --- | --- | --- |
| 844,272 | Fate | Feb. 12, 1907 |
| 1,711,749 | Schmitt | May 7, 1929 |
| 2,399,115 | Hansen et al. | Apr. 23, 1946 |
| 2,483,297 | Naylor | Sept. 27, 1949 |